April 19, 1955
C. ACKERMAN ET AL
2,706,338
GAUGE
Filed June 2, 1950
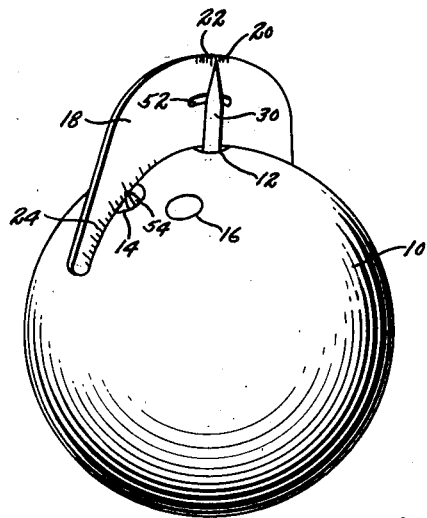
FIG. 1
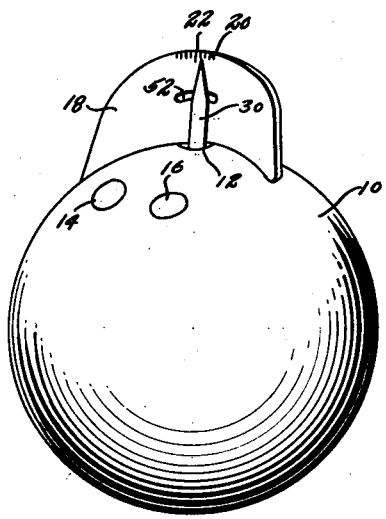
FIG. 2
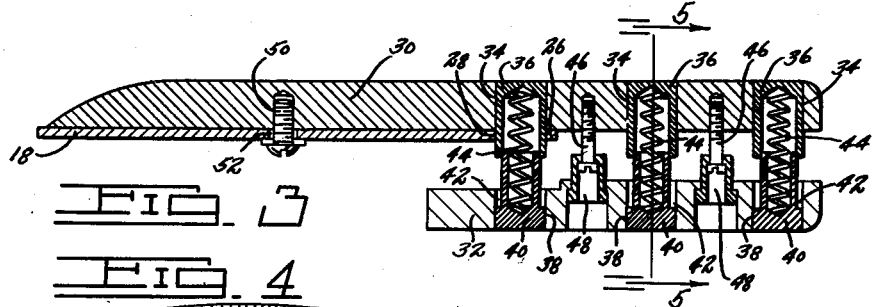
FIG. 3
FIG. 4
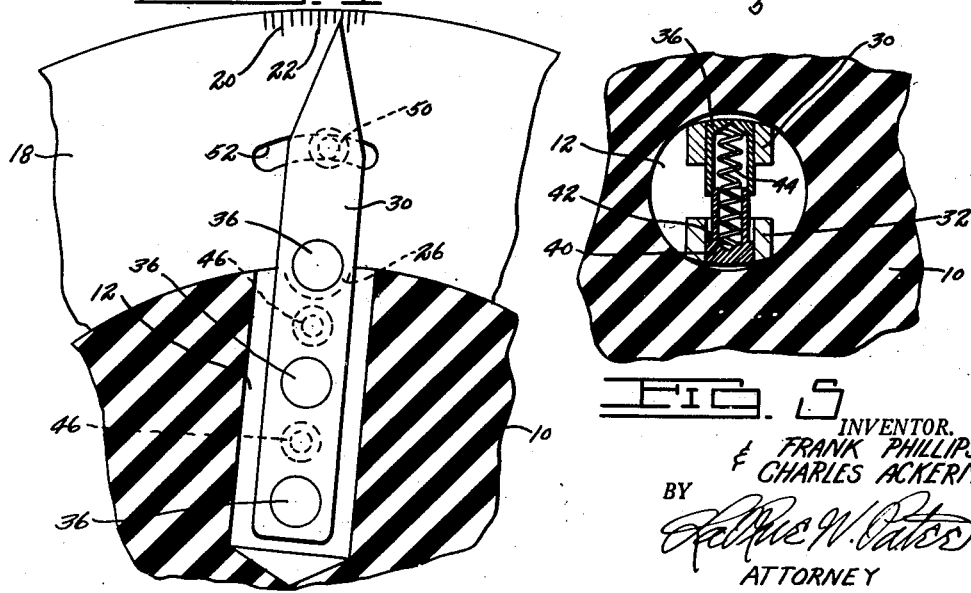
FIG. 5
INVENTOR.
FRANK PHILLIPS
& CHARLES ACKERMAN
BY
ATTORNEY

United States Patent Office 2,706,338
Patented Apr. 19, 1955

2,706,338
GAUGE

Charles Ackerman, Highland Park, and Frank Phillips, Detroit, Mich.

Application June 2, 1950, Serial No. 165,722

6 Claims. (Cl. 33—174)

This invention relates to a checking device or gauge, particularly adaptable for use in connection with bowling balls or like spherical objects having apertures in the peripherial surface thereof.

Bowling balls are provided with finger holes for gripping the ball and the spacing of the holes varies in accordance with the finger span of the individual bowler. The axial direction of the holes varies, having what is commonly called forward pitch, reverse pitch and side pitch.

When a bowler becomes accustomed to a particular finger grip and has a ball with hole spacing and angularity to fit his particular liking, it is desirable to accurately reproduce the spacing and angularity when the bowler desires to replace the ball.

The present invention is directed to a device for measuring the location and angle of the holes so that holes may be reproduced in another ball.

It is an object of the invention to provide a graduated scale having an indicator co-operating with the scale for measuring angularity of the hole in relation to peripherial surface and relative location of one hole to another.

Another object of the invention is to provide a self adjusting indicator which will automatically center itself in holes of various diameter.

Other objects and advantages of the invention will more fully appear from the following description taken in connection with the accompanying drawings, in which:

Fig. 1 is a perspective view of the gauge applied to a bowling ball on an arc passing through the thumb and a finger hole;

Fig. 2 is a view corresponding to Fig. 1 but showing the gauge located in a plane at right angles to its location in Fig. 1;

Fig. 3 is a longitudinal sectional view, in enlarged scale, showing the adjustable indicator;

Fig. 4 is a fragmentary view showing the device in side elevation applied to an angularly disposed hole in a bowling ball, the latter being in cross section; and Fig. 5 is a cross sectional view of the indicator, taken on line 5—5 of Fig. 3, showing the indicator inserted in a hole of a bowling ball, shown in cross section.

Referring to the drawings, wherein the invention has been illustrated as applied to a bowling ball, the ball 10 is shown provided with a thumb hole 12 and two finger holes 14 and 16. These holes are not always drilled with their axes on a radial line of the ball to intersect the true center of the ball. A forward pitch of the thumb hole is often referred to as the angle from the center line of the ball toward the finger hole. The reverse pitch is the angle away from the finger hole. The side pitch is the angle to the left or right of the center line which would be away from the palm or under the palm. These angles vary, depending upon the desire of the individual bowler. It is important to measure the angle so that it can be reproduced in another ball.

The invention provides a simple device which can be readily placed over a ball and the angle of the hole axis and the hole spacing quickly determined. The diameter of bowling balls is constant so that the circumference of the ball may be used as a guide in determining the spacing and angularity of the holes.

The device comprises a plate 18 shaped as a half moon having a bottom edge conforming to an arc of the ball circumference. When the plate 18 is placed on the ball, as illustrated in the drawing, with the plane of the plate at right angles to a line tangent to the ball circumference, the plate fits the curvature and extends through an arc greater than the distance between hole centers. One face of the plate at the outer edge portion is provided wtih graduations 20 which may be in markings of degrees or predetermined linear dimensions of equal spacing at opposite sides of a central line 22. Graduations 24 are provided at the inner edge of the arc along one end adjacent the region of the finger holes 14 and 16.

An inwardly extending flange 26 is provided on the inner edge of the plate 18 which is provided with an opening 28, the center of which is in the arc of the inner arcuate edge of the plate 18. The central line 22 is in radial alignment with the center of the opening 28.

The indicating mechanism of the device comprises a pointer portion 30 and a relatively movable side arm 32. The base end of the pointer portion 30 is provided with three openings 34 extending therethrough which receive thimbles 36 press fitted in the openings 34. The side arm 32 is provided with openings 38 oppositely spaced from the openings 34. The openings 38 receive thimbles 40. The outer diameter of the thimbles 40 is reduced to fit the inner periphery of the thimbles 36 and is provided with a shoulder 42 for limiting the telescopic movement of the thimbles 36 and 40. A compression spring 44 is positioned between the closed ends of the thimbles 36 and 40 for urging them apart.

Separation of the parts 30 and 32 by the spring pressure is limited by a headed screw 46 threaded into the pointer 30 and a sleeve 48 pressed into the side arm 32. The closed end of the sleeve 48 has an opening therein which slidingly fits the screw 46 and the end wall of the sleeve 48 engages the head of the screw to limit separation.

The plate 18 is held on the pointer 30, for swinging movement therewith about the thimble 36 as a center, by a screw 50 threaded into the pointer 30 and extending through a slot 52 in the plate 18.

In the operation of the device, the contractable end of the pointer 30 is inserted in the thumb hole of a bowling ball with the inner curved edge of the plate 18 contacting the outer peripheral surface of the ball and extending in a direction to overlie one of the finger holes 14 or 16. If the thumb hole is drilled at an angle to the center line of the ball, as illustrated in Fig. 4, the pointer will indicate, on the graduations 20, the number of degrees or points off of center. This measures the angularity of the hole with reference to the finger holes, either forward or reverse pitch.

Another indicator 54, similar to the construction shown in Fig. 3 but of shorter length, is inserted in the finger hole 14 and a reading on the graduations 24 is taken, recording the distance between the finger hole 14 and thumb hole 12. The plate 18 can then be moved to the finger hole 16 and the pointer 54 inserted in the finger hole 16 for determining the spacing of finger hole 16 and thumb hole 12.

In determining the angularity of side pitch, the plate is moved across the ball surface to a position at right angles to the first readings, as indicated in Fig. 2. The pointer 30 will then record the angularity of side pitch, either left or right.

The contraction and expansion of the indicators 30 and 54 permit them to be inserted in holes of various diameter and since the contact of the four corners of the indicator engage the peripherial wall of the hole the pointed end is centered in the hole.

It will be understood that while a preferred embodiment of the invention has been illustrated and described, various changes, including the size, shape and arrangement of parts, may be made without departing from the spirit of my invention and it is not my intention to limit its scope other than by the terms of the appended claims.

I claim:
1. A gauge comprising, a plate having a concave inner edge formed on the arc of a circle, an indicator pivotally supported on said plate with its center on the arc of the concave inner edge, a portion of said indicator projecting outwardly beyond the inner edge of said plate, a member carried by the outwardly projecting portion and extending longitudinally along one side face of said projecting portion, resilient means for urging said member laterally away from the outwardly projecting portion, and means for limiting the relative lateral movement of said member with respect to the outwardly projecting portion against said resilient means.

2. A gauge for checking the angular relation of a hole in a ball with respect to the radius of the ball comprising, a plate having a concave inner edge formed on the arc of a circle to fit the outer surface of the ball, one face of said plate having graduations thereon, an indicator pivotally supported on said plate at the inner concave edge of said plate, a portion of said indicator projecting outwardly beyond an edge of said plate to be received in the ball, a side arm spaced from and extending along the projected end portion, tubular telescoping members carried by said arm and said projected end portion, resilient means for urging said arm and projection into spaced relation, and stop means for limiting the movement of said arm away from said projected end portion.

3. A gauge for checking the angular relation of a hole in a ball with respect to a radial line through the ball comprising, a plate having a concave inner edge formed on the arc of a circle to fit the peripheral surface of the ball, said plate having graduations on one face thereof, an indicator pivotally supported on said plate with its pivotal center on the arc of the concave inner edge, one portion of said indicator extending over said plate for indicating one of the graduations and another portion of said indicator projecting outwardly beyond the inner edge of said plate, and expansible and contractible means carried by said last named projecting portion for varying the effective transverse dimension thereof to frictionally fit the inner periphery of variable size holes in the ball.

4. A gauge for checking the angular relation of a hole in a ball with respect to a radial line through the ball comprising, a plate having a concave inner edge formed on the arc of a circle to fit the peripheral surface of the ball, said plate having graduations on one face thereof, an indicator pivotally supported on said plate with its pivotal center on the arc of the concave inner edge, one portion of said indicator extending over said plate for indicating one of the graduations and another portion of said indicator projecting outwardly beyond the inner edge of said plate, expansible and contractible means carried by said last named projecting portion for varying the effective transverse dimension thereof to frictionally fit the inner periphery of variable size holes in the ball, and means for securing said indicator in fixed position on said plate.

5. A gauge for checking the arcuate distance between spaced holes in a ball and the angular relation of one of the holes with respect to a circular surface of the ball comprising, a plate having an inner edge portion formed concave to fit a curved surface of the ball, a first group of graduations on the face of said plate adjacent one of the holes, an indicator pivotally supported on said plate at a point in the arc of the inner edge portion of said plate and adjacent said graduations, said indicator having a pointer portion overlying said graduations and a portion projecting outwardly away from the inner curved edge portion of said plate to be received in hole, a second group of graduations on said plate spaced from said first group of graduations and overlying the other of said holes, for measuring the circular distance between the axes of said holes.

6. A gauge for checking the annular relation of a hole in a ball with respect to a radial line through the ball comprising, a plate having a concave inner edge formed on the arc of a circle to fit the peripheral surface of the ball, said plate having graduations on one face thereof, an indicator pivotally supported on said plate with its pivotal center at the arc of the concave inner edge, one portion of said indicator extending over said plate for indicating one of the graduations and another portion of said indicator projecting outwardly beyond the inner edge of said plate, and expansible and contractible means carried by said last named projecting portion for varying the effective transverse dimension thereof to frictionally fit the inner periphery of variable size holes in the ball.

References Cited in the file of this patent

UNITED STATES PATENTS

| | | |
|---|---|---|
| 714,367 | Demarty | Nov. 25, 1902 |
| 1,411,911 | Desbains | Apr. 4, 1922 |
| 1,814,266 | Stander | July 14, 1931 |
| 1,852,760 | Sisson | Apr. 5, 1932 |
| 2,088,290 | Collier | July 27, 1937 |
| 2,546,532 | Wade | Mar. 27, 1951 |